April 27, 1965    L. F. MILLER ETAL    3,180,763
PRESSURE CONTROL SYSTEM
Filed June 8, 1961    2 Sheets-Sheet 2

INVENTORS
LAWRENCE F. MILLER
JOSEPH O. THORSHEIM
BY Alfred N. Feldman
ATTORNEY

United States Patent Office 3,180,763
Patented Apr. 27, 1965

3,180,763
PRESSURE CONTROL SYSTEM
Lawrence F. Miller, Hopkins, and Joseph O. Thorsheim, Minneapolis, Minn., assignors to Honeywell Inc., a corporation of Delaware
Filed June 8, 1961, Ser. No. 115,655
8 Claims. (Cl. 136—86)

The present invention is directed to a pressure control system for a fuel cell, and more particularly is directed to a pressure control system wherein excessive pressures to a fuel cell are bled off to protect the fuel cell from damage.

The conversion of fuels into electricity has for a long period of time been accomplished by burning the fuels and subsequently converting the heat generated into a source of driving power for an electric generator. Due to the inherent losses of this type of system, the net usable energy from the system is approximately 30 percent of the fuel's total energy. This type of arrangement obviously is inefficient and as such, investigations have long been underway into means of converting fuels directly into electrical energy without passing through the stage of heat conversion. For many years the transformation of fuel directly into electrical energy has been theoretically recognized and various types of cells for this type of operation have been tested. Basically, the cells are referred to as fuel cells, a simple battery being one special case of a fuel cell.

One general type of fuel cell is an arrangement wherein two fluids are caused to react to generate an electric current. Probably one of the most common types of fuel cells is a cell wherein hydrogen and oxygen are fed into cavities that form electrodes for the unit. These electrodes normally are of a material such as carbon and allow for the hydrogen and oxygen to pass into their surface, since carbon can be made as a rather porous material. The hydrogen and oxygen then come into contact with an electrolyte, which can be such a material as potassium hydroxide. The reducing agent or fuel loses an electron at the electrolyte-electrode interface. The oxidant gains an electron at the opposite electrode forming an anion. The internal circuit is completed by ionic conduction. For convenience, this reaction will be referred to as a chemical reaction with the electrolytic material. The product of reaction from this type of cell is a flow of hydrogen and water vapor from one electrode structure and an excess of oxygen from the other electrode structure. While the hydrogen and oxygen type of cell is now quite common, it is understood that the present invention is not directed to this type of gas fueled cell alone, but is directed to any type of fuel cell that utilizes at least one fluid fuel in its operation.

In the present invention, the exact type of fuel cell is not of great importance, but one will be described in some slight detail in order to correlate the material as to the inventive system. The present invention lies in control of at least one of the fuels, in the form of a fluid, to a fuel cell that utilizes two separate fuels as a source of energy. In order to understand the need for the present control system it is pointed out that in many cases, pressures to a cell are lost, or leak through a normally otherwise closed valve means. The fuel cell, when operating properly can have a practical efficiency as high as approximately 80 percent or more. As a loss of control occurs, this output can drop substantially. In addition to the loss of output, a fuel cell can be mechanically injured by the application of an unbalance of fuels to the cell. More specifically, it is quite harmful to a fuel cell if a fuel pressure is applied to the cell when an electrolytic pressure is not available to that same cell to balance the pressures within the electrode structure of the cell. It is therefore an important feature of the present control system that a balance of fuels be kept at the electrode surface of a fuel cell and that if the electrical load is removed and the electrolyte pressure is reduced, that the fuel pressures are bled off. If leakage occurs, this leakage is also removed by the present invention by bleeding the fuel to the atmosphere or some convenient passage.

In the present invention, a unique type of bleed means is provided that is adjusted automatically by the operation of the fuel cell to the proper bleed pressure for the unit. If the pressure applied to the fuel cell is increased the point at which the bleed valve operates is raised accordingly. If the fuel cell is shut down, any leakage of fuel past the closeoff valves or pressure regulators to the fuel cell are automatically bled off to protect the cell from any type of over-pressure or abnormal pressure at an adjustable nominal value. It should be understood that while the present system is described as operating on two gaseous type fuels, that the present invention can be readily applied to any type of fuel cell that uses at least one fluid pressure. In many types of fuel cells, two fluid fuels are utilized, but there are certain types of fuel cells that operate on one fluid fuel and one solid or semi-solid type of fuel material. More specifically, there are types of cells that use one fluid fuel in the form of a gas and the second fuel in the form of a semi-solid, such as, extruded sodium. The particular type of fuel cell is immaterial to the invention involved and the only requirement for the utilization of the present invention is that a fuel cell exists that requires protection against over-pressure in at least one fuel line which carries some form of fluid fuel that is moved under pressure.

It is the primary object of the present invention to provide a pressure control system for a fuel cell wherein bleed valve means is provided in one of the fluid fuel lines to protect the cell from an overpressure.

It is a further object of the present invention to disclose a pressure responsive bleed valve that adjusts to the operating point of the fuel cell to which it is connected.

Yet another object of the present invention is to disclose a bleed valve that prevents any abnormal pressure from building up on a fuel cell when the cell is shut down. Such a buildup could occur by leakage of a fuel, such as a gas, past a valve seat which was normally inserted to cut off the flow of fluid to the cell.

Still a further object of the present invention is to disclose a bleed valve that bleeds the leaking fluid to the fuel cell, but applies a second or safety valve to the bleed valve to prevent fluid from reaching the bleed valve diaphragm when it is not at normal pressure.

Another object is to provide a bleed valve to a fuel cell system that will automatically bleed the fuel lines whenever the fuel lines and the pressure to the electrolyte are closed off.

These and other objects will become apparent when a full consideration is undertaken of the present specification and drawings.

In FIGURE 1 there is disclosed in schematic form, a hydrogen-oxygen supply system, a fuel control device, and a bleed valve means for protection of a hydrogen-oxygen fuel cell;

Figure 1:
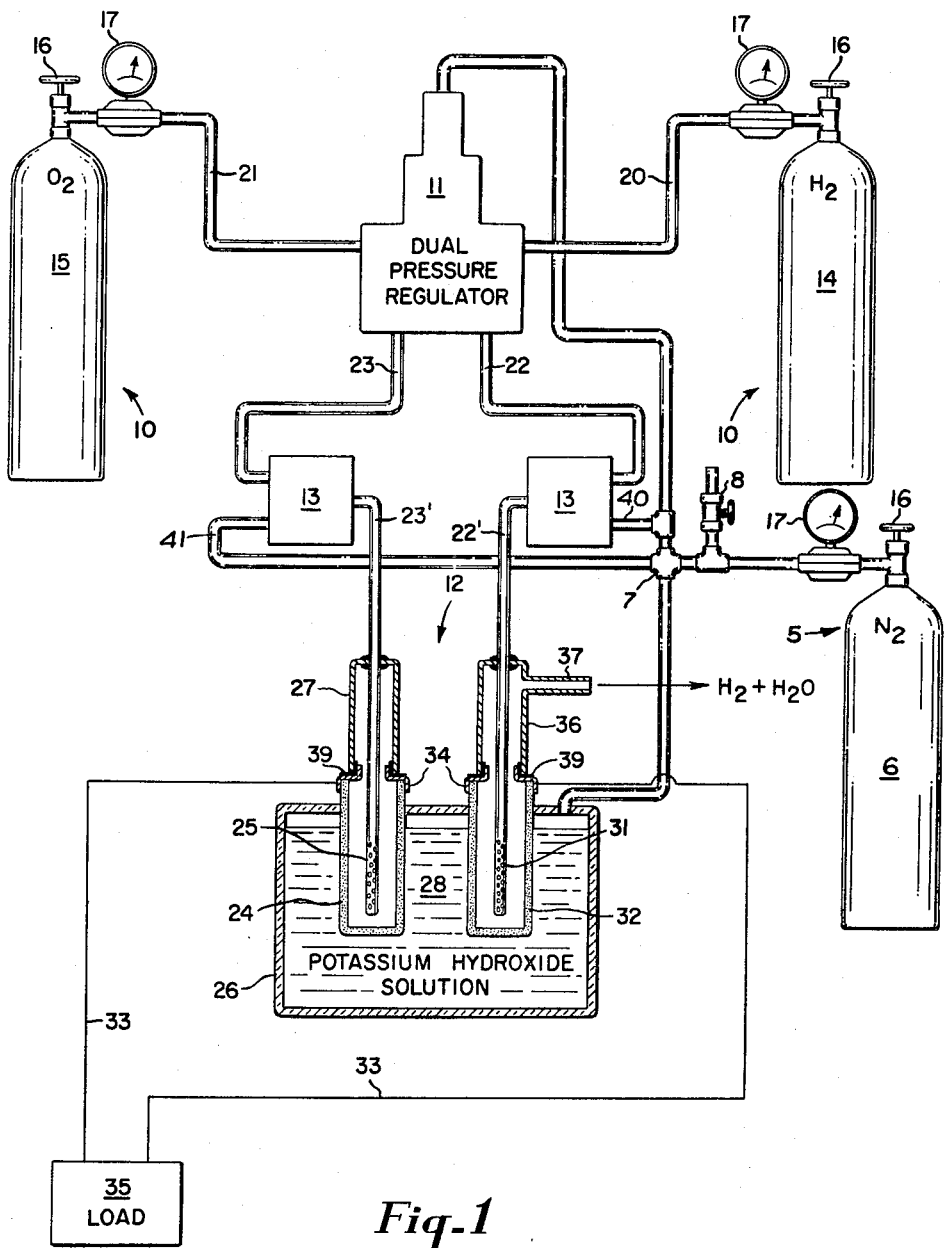

In FIGURE 1 there is generally disclosed, in schematic form, a pressure system 5, a fluid fuel supply means 10, a control device 11 in the form of a dual pressure regulator, and a fuel cell 12. Interposed between the dual pressure regulator 11 and the fuel cell 12 are a pair of bleed valve means 13 that will be described in detail in connection with FIGURES 2, 3, and 4. For the present discussion it is sufficient to generally indicate that the bleed valve means 13 is a safety device between the fuel supply means 10, the dual pressure regulator 11 and the fuel cell 12.

The fuel supply means 10 consists of a pressurized bottle of hydrogen 14 and a pressurized bottle of oxygen 15. The pressurized bottles each have a control valve 16 and a general pressure regulator 17. By opening the valve 16 a rough regulation of pressure output can be obtained by setting the pressure regulator at a desired level. This places a very roughly regulated hydrogen pressure in pipe 20 and a similarly regulated pressure of oxygen in pipe 21. The pipes 20 and 21 feed into the dual pressure regulator 11 that adjusts the pressure of the hydrogen and oxygen very accurately against one another and against the reference pressure system 5. The pressure system 5 includes a pressurized bottle of nitrogen 6 supplied through a valve 16 and a regulator 17 to a pipe system 7. The pipe system 7 supplies nitrogen gas pressure to the control device 11, to the fuel cell 12, and to the bleed valve means 13. The pipe system 7 includes a manual bleed valve 8 to vent the system to the atmosphere, if necessary. The details of the dual pressure regulator 11 are not material to the present invention but merely are a means of obtaining a carefully regulated pressure on pipes 22 and 23 which in turn supply fuel for the cell 12 through the bleed valve means 13. One type of regulator that meets this requirement is shown in a co-pending application assigned to the assignee of the present application, and is the J. O. Thorsheim application, Serial No. 100,613, filed April 4, 1961, now Patent No. 3,087,004. The pipes 22 and 23 form inlet means to the bleed valve means 13 while pipes 22' and 23' form outlet means for the bleed valve means 13 and deliver the normal flow of hydrogen and oxygen to fuel cell 12.

The oxygen from pipe 23' is fed to a carbon electrode 24 through holes 25 in the end of pipe 23'. The oxygen in the electrode 24 diffuses into the walls of the carbon electrode with a potassium hydroxide solution 28 that fills a container 26 into which the electrode 24 is sealed. The excess oxygen passes from the electrode 24 into an upper chamber 27.

The hydrogen supplied through pipe 22' is fed through holes 31 into a chamber formed by an electrode 32. The electrode 32 allows the hydrogen to diffuse into its surface with the potassium hydroxide solution 28. Here the hydrogen unites with hydroxyl ions which have migrated through the electrolyte from the electrode 24 and releases an electron. The electron is the work performing product of the fuel cell and flows to an external electric circuit. This circuit is disclosed as wires 33 connected to the top of the electrodes at 34 and going to an electrical load 35. The excess hydrogen and a by-product, in the form of water, pass into an upper chamber 36 that is attached to the top of the electrode 32 and passes out of a pipe 37 to the atmosphere. The electrodes 24 and 32 are electrically insulated by insulating members 39 to keep the upper chambers 27 and 36 separate, from an electrical standpoint, from the electrodes 24 and 32. It is understood that the pressure of the hydrogen and the oxygen in pipes 22' and 23' must be kept closely regulated and must be maintained within very close limits of a set control point provided by the pressure system 5. This is the function of the dual pressure regulator 11.

The potassium hydroxide solution 28, in an active fuel cell, is normally kept under pressure from the pressure system 5 through the pipe system 7 in order to balance the pressures of the hydrogen and oxygen to keep an interface within the electrodes 24 and 32 for the reaction of the fuel cell. In order to obtain the regulation of the novel bleed valve means of the present invention a pair of feedback pipes 40 and 41 are connected to pipe system 7 and to the bleed valve means 13. The feedback pipes 40 and 41 supply a nitrogen pressure to the bleed valve means 13 in order to establish the operating point of the bleed valve means 13. This will be brought out in detail in connection with the description of the bleed valves themselves contained in FIGURES 2, 3, and 4.

Figure 2:
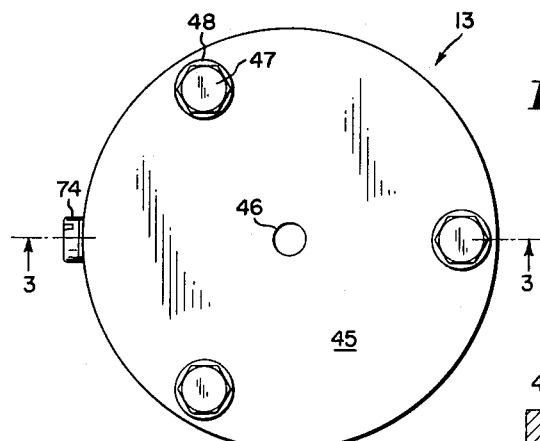
FIGURE 2 is a top view of one version of the novel bleed valve.
Figure 3:
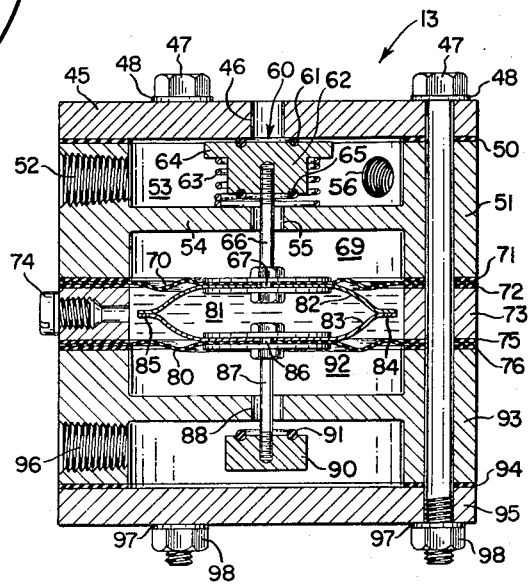
FIGURE 3 is a cross-section of the bleed valve of FIGURE 2 which incorporates certain safety features.

In FIGURE 2 there is disclosed a top view of the bleed valve means 13, while in FIGURE 3 there is a cross section taken along lines 3—3 of FIGURE 2. The top view in FIGURE 2 indicates that the over-all device is round in configuration. A top plate 45 is provided with a bleed port 46 in the form of a hole. The plate 45 has appropriate holes equally spaced around its periphery for passage of bolts 47 and washers 48 which are used to assemble the unit. The top plate 45 is sealed by gasket 50 to an annular body 51 that has a tapped inlet 52 that is connected to either pipe 22 or 23 depending upon whether the bleed valve means 13 is connected in the hydrogen or the oxygen lines. The tapped opening 52 leads into a fuel chamber 53, and to a partition means 54 which has a hole 55 that provides free communication to a diaphragm chamber 69. A tapped outlet hole 56 leads out of chamber 53 and will be connected with pipes 22' or 23', depending on the side of the cell to which the unit is connected. Mounted above the partition means 54 is a valve means 60 that forms part of a bleed valve and a safety valve for the unit. The valve means 60 has an O-ring 61 that is mounted in the body 62 of the valve means 60. The O-ring in its normal position, seals the hole 46 in a fluid tight fashion and prevents the flow of any fuel out of the bleed port 46. A resilient means or spring 63 is provided between a flange 64 on the valve means 60 and partition means 54 to hold the valve means 60 in its upward position as shown in FIGURE 3. A second O-ring 65 is embedded in the bottom of the valve means 60 and seals the opening 55 if the valve means 60 is moved down against the bias of spring 63.

Threaded into the valve means 60 is a stem 66 that is attached at support means 67 to a diaphragm or flexible partition means 70. The diaphragm 70 is of any convenient type and is supported in a conventional fashion at its center by the stem 66 and support means 67. The diaphragm 70 is sealed by gaskets 71 and 72 so as to provide a fluid tight chamber. A ring 73 is provided with a filling plug 74 which is turn is mounted next to a pair of gaskets 75 and 76 which in turn support a second diaphragm or flexible partition means 80. The space between the diaphragm 70 and the diaphragm 80 is filled with a fluid 81 of an incompressible type. The filling occurs through the plug 74 and forms a safety chamber which allows the two diaphragms 70 and 80 to be forced together in case of a rupture of either of the diaphragms. The diaphragms 70 and 80 are attracted to one another by a pair of springs 82 and 83 that are joined at their ends 84 and 85. The springs 82 and 83 are also part of the safety feature and pull the two diaphragms together if the fluid 81 is ever released through a rupture in the diaphragms 70 or 80. The chambers incorporating the fluid 81 and the diaphragms 70 and 80 are generally referred to as a flexible partition means, and in certain embodiments, this partition means could be connected to a fluid fill responsive to the electrolytic material in the electrolytic solution 28 which is contained in the cell or to the nitrogen supply 6.

The lower diaphragm 80 is supported by means 86 and is attached to a shaft 87 that passes through a hole 88 and is terminated in a valve means 90 that has an O-ring 91 that seals the hole 88 if the diaphragms 70 or 80 ever rupture and the springs 82 and 83 brings the stems 66 and 87 together. The volume beneath the diaphragm 80 generally forms a chamber 92 with the annular support member 93, the gasket 94, and end plate 95. The chamber 92 is a fluid tight chamber that is responsive to the nitrogen pressure on the potassium hydroxide solution 28 or the electrolyte of the fuel cell. The nitrogen pressure is supplied to chamber 92 by threaded opening 96 that is brought through the member 93. The threaded opening 96 is connected to either pipe 40 or 41 of the disclosure of FIGURE 1, depending upon whether it is connected to the bleed valve means 13 for the oxygen or the hydrogen side of the cell. Washers 97 and nuts 98 complete the assembly of the described unit.

The operation of the unit will be described in connection with the oxygen side of the cell disclosed in FIGURE 1, and therefore pipe 23 is connected to the inlet 52, while the pipe 41 is connected to the inlet 96. The outlet 56 is connected to pipe 23' and completes the safety hookup for the present unit. It will be appreciated that if a fluid pressure is supplied to the threaded opening 52, and an equal pressure is applied by the electrolytic solution 28 and the tapped opening 96, that the flexible partition means incorporating diaphragms 70 and 80 are held in equilibrium, the valve means 60 is in its shown position. This allows free fluid flow from the opening 52 to the opening 56 and allows free communication of the nitrogen pressure to the underside of diaphragm 80. If for some reason a pressure unbalance occurs and the nitrogen pressure is lost, the fuel pressure entering 52 overcomes the spring 63 by applying pressure to the top of the diaphragm 70. This operation opens the valve means 60 to the bleed port 46 by removing the O-ring 61 from the underside of the upper plate 45. This also drives the valve means 60 in a downward direction seating the O-ring 65 against the partition means 54. The sealing of O-ring 65 on partition means 54 seals the diaphragm chamber 69 and prevents damage to the diaphragms 70 and 80. As soon as a balance of pressures is restored to the inlets 52 and 96, the diaphragms 70 and 80 return to the position shown and normal operation again returns to the cell.

The above described unit also provides a safety device in case of shutdown of the fuel cell and any leakage through the dual pressure regulator 11. If the fuel cell system is shut down with no nitrogen pressure on the potassium hydroxide electrolyte solution 28, and no pressure on the oxygen side, the flexible partition means is in the position shown. If for some reason the dual pressure regulator 11 should leak oxygen when it is normally in a closed position, a fuel pressure will build up in chamber 53. Since chamber 53 is open to the outlet 56, the leakage pressure would then build up in the internal section of electrode 24 tending to force its way into the potassium hydroxide solution 28. This condition can damage a fuel cell rather severely and protection is necessary. It will be noted that if the fuel leaks into chamber 53 that the pressure buildup is against the diaphragm 70 thereby tending to overcome the spring 63. If the spring 63 is overcome, the valve means 60 moves downward opening the bleed port 46 to the atmosphere, and eventually closing the safety valve means in the form of O-ring 65 against the partition means 54. As soon as the pressure is relieved in chamber 53, the spring 63 returns the valve means 60 to its upward position thereby closing the bleed to the atmosphere. With the valve of FIGURE 3, the fuel can never build up beyond the value established by spring 63.

In order to make the unit operative at high pressures when the electrolyte material is also pressurized, it will be noted that the addition of the nitrogen pressure to inlet 96 raises the operating point of the over-all unit so that the fuel entering inlet 52 to chamber 53 must reach a value above the nitrogen pressure being supplied to chamber 92 by the way of inlet 96. In this manner the fuel pressure allowed to the cell is regulated by a reference to the nitrogen pressure and can reach the electrolyte fluid pressure or a pressure slightly higher as determined by the spring 63. It is thus apparent that a safety unit is disclosed which will shut itself down upon the rupture of the flexible partitions means, upon an overpressure supplied when the cell is operating upon an intentional lowering of the electrolyte pressure, or an accidental leakage of fluid pressure to the cell when the device is shut down. The present bleed valve means therefore is a safety device that is capable of being adjusted to any convenient operating point by merely applying a pressure to the appropriate chamber.

Figure 4:
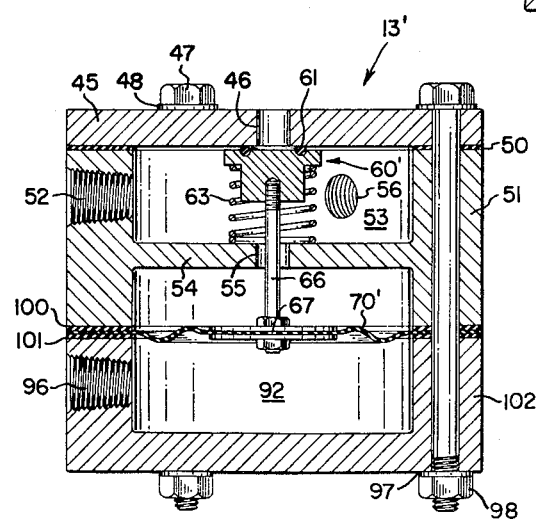
FIGURE 4 is a cross-section of a simplified bleed valve without the safety features of the device disclosed in FIGURE 3.

In FIGURE 4, there is disclosed a modified form of the bleed valve means 13. The bleed valve means 13' is built up very similarly to the bleed valve means of FIGURE 3 but certain of the safety features have been eliminated. The bleed valve means 13' has a cover plate 45 which is assembled by bolts 47 and washers 48 to a body 51 and sealed by gasket 50. A bleed port 46 is again provided with a valve means 60'. Valve means 60' has an O-ring seal 61 and a spring 63 that is supported from a partition means 54. The structure is substantially identical except that the safety valve portion of the valve means 60' has been eliminated. In the present case an outlet port 56 is again provided in chamber 53 which has an inlet 52. The valve means 60' is connected by shaft 66 through a hole 55 to a diaphragm support means 67 and a diaphragm 70'. The diaphragm 70' is sealed by gaskets 100 and 101 to a lower chamber 102. The unit is held in assembled relationship by washers 97 and nuts 98 in the same fashion as in FIGURE 3. Once again the lower chamber 102 has an inlet 96 that opens into a nitrogen pressure chamber 92 that is supplied to the bottom of diaphragm 70'.

The simplified version operates in exactly the same fashion as the more sophisticated device of FIGURE 3. A nitrogen pressure is applied through opening 96 to chamber 92 to apply pressure to the underside of diaphragm 70'. A fluid pressure is supplied through opening 52 to chamber 53 to balance the nitrogen pressure on the diaphragm 70' and hold the valve means 60' in the position shown. If the nitrogen pressure to chamber 92 is removed, the fluid pressure on the top of diaphragm 70' exerts a downward force opening valve means 60' thereby removing the O-ring 61 from its seat against the plate 45. This opens a bleed port 46 to the atmosphere and dumps any excess fuel. It will be noted that the device in FIGURE 4 has eliminated the safety chamber between the diaphragms and also the safety valve means to protect the diaphragm against rupture. The simplified version in FIGURE 4 can be utilized where a rupture of the diaphragm 70' is not critical in the system and where cost is a primary concern.

The pressure control system for the fuel cell in the form of a bleed valve means has been described in detail in two of its many possible forms. The bleed valve means of FIGURE 3 has proved highly successful and is one of the preferred embodiments of the presently encompassed device. It has been shown by the differences in the devices disclosed in FIGURES 3 and 4 that it is possible to build up the unit in various configurations. The configurations of FIGURES 3 and 4 are only two of the many possible embodiments in which the present pressure control system for a fuel cell could be encompassed. In view of the nature of the present system, the applicants wish to be limited in their invention only to the scope of the appended claims.

The embodiments of the invention in which an exclusive property or privilege is claimed are defined as follows:

1. In a pressure control system for a fuel cell wherein two fuels chemically react with an electrolytic fluid to liberate electrical energy which can flow through an external electric circuit comprising: supply means including a fluid fuel supplied for consumption in said fuel cell; inlet means connected to said supply means and outlet means connecting said fuel to said cell; bleed valve means in said outlet means to protect said cell from abnormal pressure; said bleed valve means having flexible partition means responsive to a fluid pressure applied to said electrolytic fluid; said flexible partition means being in a normal position when said fuel and said electrolytic fluid are at operating pressures for said cell; said bleed valve means allowing free fuel flow to said flexible partition means when said normal position is maintained; and said bleed valve means and said flexible partition means further closing a bleed port when said normal position is maintained; said flexible partition means being moved by an abnormal pressure in said outlet means thereby opening said bleed port to relieve said abnormal pressure.

2. In a pressure control system for a fuel cell wherein two fluids chemically react with an electrolytic fluid to liberate electrical energy which can flow through an external electric circuit comprising: supply means including two fluid fuels supplied for consumption in said fuel cell; inlet means connected to said supply means and outlet means connecting said fuels to said cell; bleed valve means in said outlet means to protect said cell from abnormal pressure; said bleed valve means having flexible partition means responsive to a fluid pressure applied to said electrolytic fluid; said flexible partition means being in a normal position when said fuel and said electrolytic fluid are at operating pressures for said cell; said bleed valve means allowing free fuel flow to said flexible partition means when said normal position is maintained; and said bleed valve means and said flexible partition means further closing a bleed port when said normal position is maintained; said flexible partition means being moved by an abnormal pressure in said outlet means thereby opening said bleed port to relieve said abnormal pressure.

3. In a pressure control system for a fuel cell wherein two fluids chemically react with an electrolytic fluid to liberate electrical energy which can flow through an external electric circuit comprising: supply means including two fluid fuels supplied for consumption in said fuel cell; pressure regulator means for controlling said two fluids and having inlet means connected to said supply means and outlet means connecting said fuels to said cell; bleed valve means in said outlet means to protect said cell from abnormal pressure; said bleed valve means having diaphragm means responsive to a fluid pressure applied to said electrolytic fluid; said diaphragm means being in a normal position when said fuel and said electrolytic fluid are at operating pressures for said cell; said bleed valve means including flow means allowing free fuel flow to said diaphragm means and a fuel outlet when said normal position is maintained; and said bleed valve means and said diaphragm means further closing a bleed port to the atmosphere when said normal position is maintained; said diaphragm means being moved by an abnormal pressure in said outlet means thereby opening said bleed port to relieve said abnormal pressure.

4. In a pressure control system for a fuel cell wherein two gases chemically react with an electrolytic fluid to liberate electrical energy which can flow through an external electric circuit comprising: supply means including two gases supplied for consumption in said fuel cell; a pressure regulator for controlling said two gases and having inlet means connected to said supply means and outlet means connecting said gases to said cell; a bleed valve in said outlet means to protect said cell from abnormal gas pressure; said bleed valve including diaphragm means responsive to a fluid pressure applied to said electrolytic fluid; said diaphragm means being in a normal position when said gases and said electrolytic fluid are at operating pressures for said cell; said bleed valve means including flow means allowing free gas flow to said diaphragm means and a gas outlet when said normal position is maintained; and said bleed valve means and said diaphragm means further closing a bleed port to the atmosphere when said normal position is maintained; said diaphragm means being moved by an abnormal gas pressure in said outlet means thereby opening said bleed port to relieve said abnormal gas pressure.

5. In a pressure control system for a fuel cell wherein two fuels chemically react with an electrolytic fluid to liberate electrical energy which can flow through an external electric circuit comprising: supply means including a fluid fuel for consumption in said fuel cell; inlet means connected to said supply means and outlet means connecting said fuel to said cell; bleed valve means in said outlet means to protect said cell from abnormal pressure; said bleed valve means having chamber means connected to a fluid pressure applied to said electrolytic fluid and second chamber means connected to said outlet means for said fluid fuel; said chamber means separated by flexible partition means which is in a normal position when said fuel and said electrolytic fluid are at operating pressures for said cell; said bleed valve means closing a bleed port when said normal position is maintained; and said bleed valve means including resilient bias means to hold said bleed port closed when said normal position is maintained by said flexible partition means; said resilient means being overcome by an abnormal pressure in said chamber means and said flexible partition means thereby opening said bleed port to relieve said abnormal pressure.

6. In a pressure control system for a fuel cell wherein two fuels chemically react with an electrolytic fluid to liberate electrical energy which can flow through an external electric circuit comprising: supply means including a fluid fuel for consumption in said fuel cell; inlet means connected to said supply means and outlet means connecting said fuel to said cell; bleed valve means in said outlet means to protect said cell from an abnormal pressure; said bleed valve means having a chamber connected to a fluid pressure applied to said electrolytic fluid and a chamber connected to said outlet means for said fluid fuel; said chambers separated by diaphragm means which is in a normal position when said fuel and said electrolytic fluid are at operating pressures for said cell; said bleed valve means further closing a bleed port when said normal position is maintained; and said bleed valve means including resilient bias means to hold said bleed port closed when said normal position is maintained by said diaphragm means; said resilient means being overcome by an abnormal pressure in said fuel chamber which creates a differential pressure across said diaphragm means thereby opening said bleed port to relieve said abnormal pressure.

7. In a pressure control system for a fuel cell wherein two fuels chemically react with an electrolytic fluid to liberate electrical energy which can flow through an external electric circuit comprising: supply means including a fluid fuel supplied for consumption in said fuel cell; inlet means connected to said supply means and outlet means connecting said fuel to said cell; bleed valve means in said outlet means to protect said cell from an abnormal pressure; said bleed valve means having a chamber connected to a fluid pressure applied to said electrolytic fluid and a chamber connected to said outlet connection means for said fluid fuel; said chambers separated by diaphragm means which is in a normal position when said fuel and said electrolytic fluid are at operating pressures for said cell; said fuel chamber separated by safety valve means connected to said diaphragm means; said safety valve means further allowing free fluid flow to said diaphragm means and a fuel outlet when said normal position is maintained; said bleed valve means closing a bleed port when said normal position is maintained; and said bleed valve means including spring means to hold said bleed port closed and said safety valve means open when said normal position is maintained by said diaphragm means; said spring means being overcome by an abnormal pressure in said fluid fuel chamber which creates a differential pressure across said diaphragm means thereby opening said bleed port to relieve said abnormal pressure, and closing said safety valve means to said diaphragm means.

8. In a pressure control system for a fuel cell wherein two gases chemically react with an electrolytic fluid to liberate electrical energy which can flow through an external electric circuit comprising: supply means including two gas fuels supplied for consumption in said fuel cell; pressure regulator means for controlling said two gases and having inlet means connected to said supply means and outlet means connecting said fuels to said cell; bleed valve means in each said outlet means to protect said cell from abnormal pressure; each of said bleed valve means having a chamber connected to a fluid pressure applied to said electrolytic fluid and a chamber connected to said outlet means for one of said gases; said chambers separated by diaphragm means which are in a normal position when said gases and said electrolytic fluid are at operating pressures for said cell; each of said gas chambers separated by safety valve means connected to said diaphragm means and said safety valve means allowing free gas flow to said diaphragm means and a gas outlet when said normal position is maintained; said bleed valve means closing a bleed port when said normal position is maintained; and said bleed valve means including spring means to hold said bleed port closed when said normal position is maintained by said diaphragm means; said spring means being overcome by an abnormal pressure in said gas chamber to create a differential pressure across said diaphragm means thereby opening said bleed port to relieve said abnormal pressure, and to close said safety valve means to said diaphragm means to protect said diaphragm means from said abnormal pressure.

References Cited by the Examiner
UNITED STATES PATENTS

| | | | |
|---|---|---|---|
| 1,815,394 | 7/31 | Boosey | 137—510 |
| 2,326,825 | 8/43 | Bucknam | 137—510 |
| 2,335,762 | 11/43 | Hunt et al. | 137—510 |
| 2,359,111 | 9/44 | Hughes | 137—510 |
| 2,384,463 | 9/45 | Gunn et al. | 136—86 |
| 2,576,541 | 11/51 | Schmitt | 137—510 |
| 3,002,039 | 9/61 | Bacon | 136—86 |

JOHN H. MACK, *Primary Examiner.*
JOHN R. SPECK, *Examiner.*